(No Model.) 2 Sheets—Sheet 1.

W. S. HILL.
ELECTRIC MOTOR.

No. 457,534. Patented Aug. 11, 1891.

WITNESSES
Jno. G. Hinkel.
S. L. Johnson

INVENTOR
W. S. Hill
by Foster & Freeman
Attorneys

THE NORRIS PETERS CO., PHOTO-LITHO., WASHINGTON, D. C.

(No Model.) 2 Sheets—Sheet 2.

W. S. HILL.
ELECTRIC MOTOR.

No. 457,534. Patented Aug. 11, 1891.

WITNESSES
Jno. G. Hinkel
S. L. Johnson

INVENTOR
W. S. Hill
by Foster & Freeman
Attorney

UNITED STATES PATENT OFFICE.

WARREN S. HILL, OF BOSTON, MASSACHUSETTS.

ELECTRIC MOTOR.

SPECIFICATION forming part of Letters Patent No. 457,534, dated August 11, 1891.

Application filed June 23, 1890. Serial No. 356,339. (No model.)

*To all whom it may concern:*

Be it known that I, WARREN S. HILL, a citizen of the United States, residing at Boston, Suffolk county, Massachusetts, have invented certain new and useful Improvements in Electric Motors, of which the following is a specification.

My invention relates to electric motors; and it consists in the features of construction and arrangement hereinafter more particularly pointed out.

Figure 1:
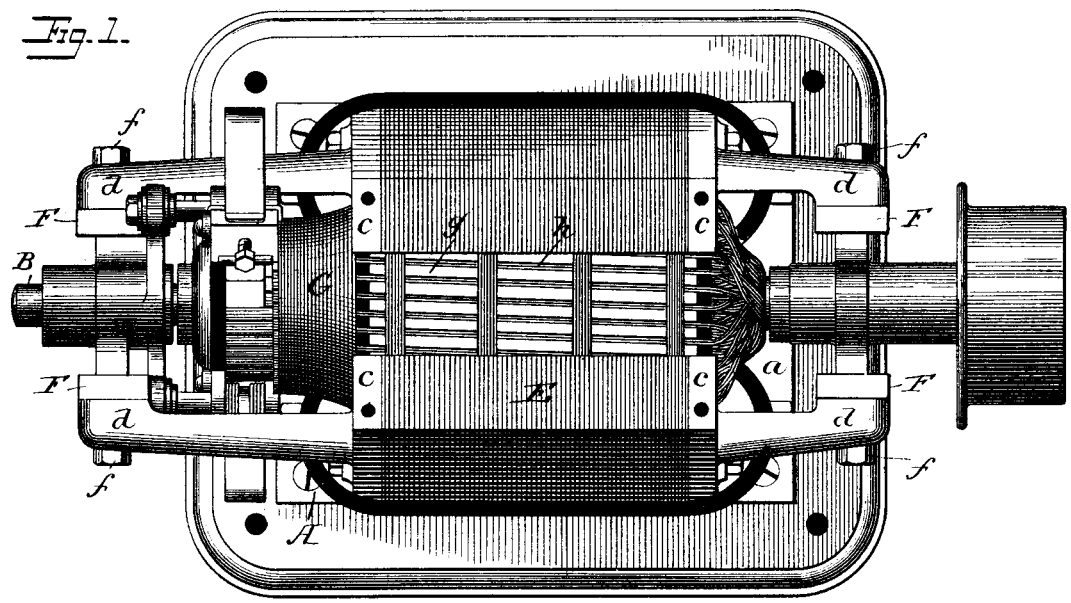
Figure 2:
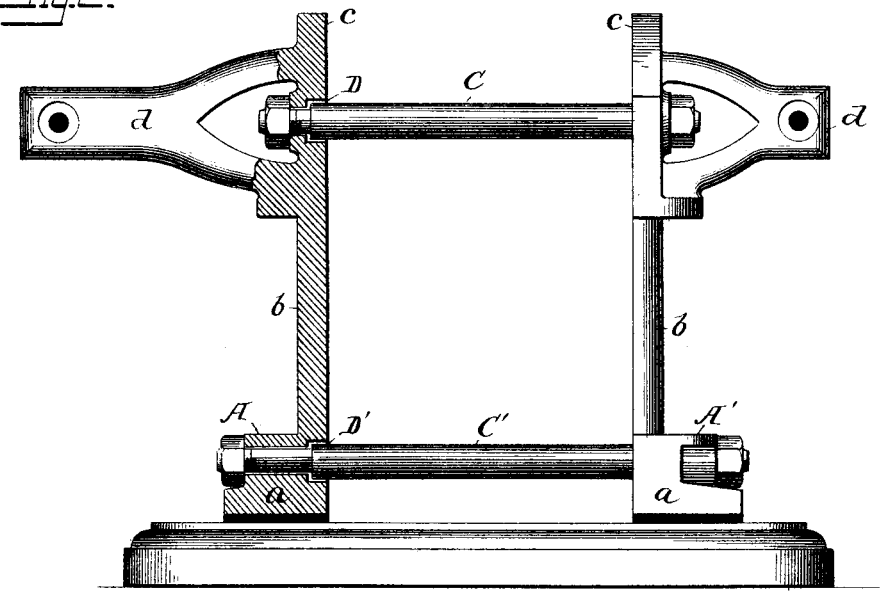
Figure 3:
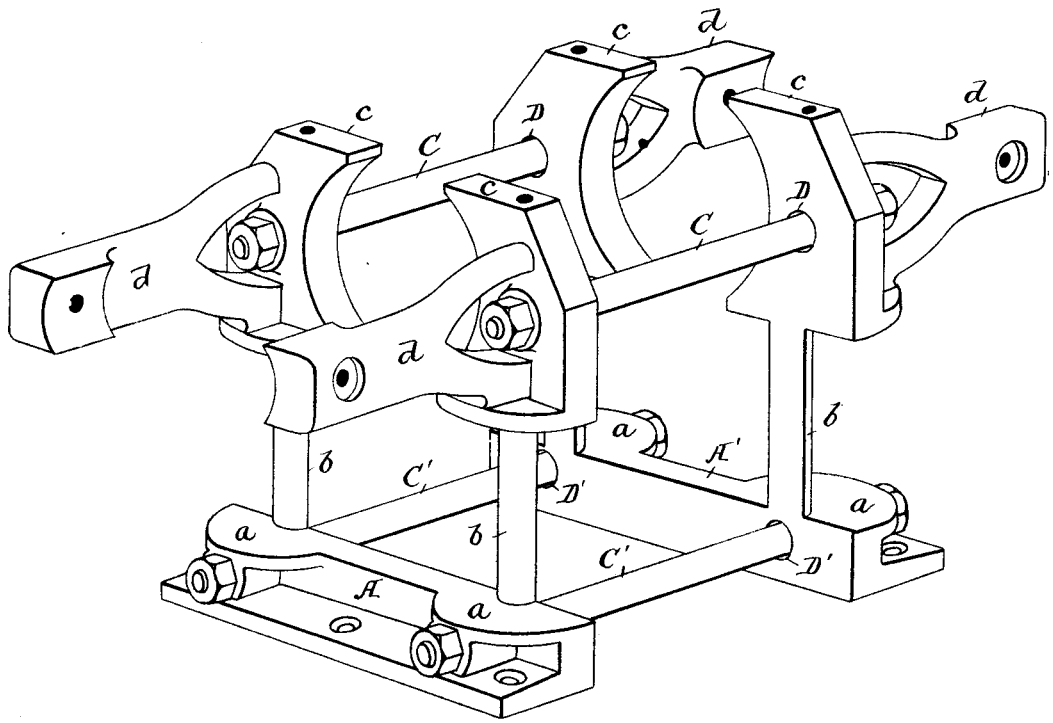
Figure 4:
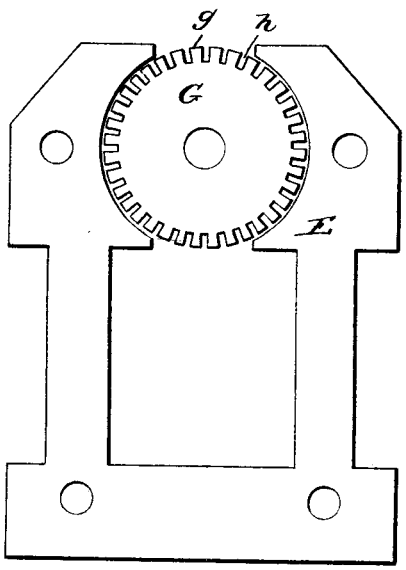

Referring to the accompanying drawings, Figure 1 is a plan view of a motor embodying my invention. Fig. 2 is a side view, partially in section, of the frame of the motor. Fig. 3 is a perspective view showing the frame of the motor, and Fig. 4 is a side view of one of the plates of the field-magnet.

One of the essential features of my invention relates more particularly to the field-magnets of the motor. These magnets are made up of thin plates of sheet metal stamped or otherwise cut or formed into the desired shape, as shown in Fig. 4, the magnets being composed of a greater or less number of these plates placed side to side. In order to hold these plates firmly in position and to make a compact mass of metal, I provide metal end plates and means for securing and holding them against the sheet-metal plates of the field-magnets. In doing this I preferably construct a metallic frame out of cast or wrought iron, the parts of which are secured together by bolts and adjusting-screws, and I clamp the sheet-metal plates between them.

Referring more particularly to Figs. 2 and 3, A A' represent two end plates forming what may be termed the "shell" or "skeleton" of the motor. Each one of these plates consists of a base-piece *a*, having two uprights *b*, preferably formed integral therewith, the upper ends of which are curved to correspond to the shape of the poles *c*. Secured to and preferably forming a part of each of the uprights or standards *b* are the extensions or arms *d*, which furnish the bearings for the armature-shaft D, and these are bifurcated at their point of junction with the upright standards, not only to strengthen them, but to furnish ready access to the nuts or bolts which clamp the end plates together. The standards *b* are preferably rounded, as shown in Fig. 2, for the reception of the field-magnet coils. The field-magnets, as before stated, consist of plates of sheet-iron cut substantially in the shape shown in Fig. 4, and a number of these are clamped together between the end pieces A A'. In order that they may be so clamped, the rods C C' extend through perforations in the plates, and are provided at their ends with nuts or bolts for tightening them. In order to prevent one or more of the plates interfering with the shoulders on the bolts, and thereby precluding their being properly tightened, I recess the end plates at the bolt-holes, as shown at D, and the rods C have their ends reduced to pass through the openings in the end plates A A'.

As it is exceedingly difficult in magnets made up of thin plates to adjust the parts accurately and at the same time tightly, I have found it advantageous to use the skeleton frame above described and to secure the two parts of the frame together by the rods having reduced ends and abutments fitting into the recesses in the face of the plates. In this way the nuts can be tightened, compressing the plates between the sides of the frame and seating the abutments in the recesses, when the frame will be in proper adjustment and accurately support the armature-shaft. This arrangement is of greater importance in view of the fact that the projections forming the bearings or supports for the armature-shafts are made integral with the end plates, and it is therefore desirable that they can be readily and definitely adjusted. In this way it will be seen that the field-magnets proper are composed of plates of sheet metal E, which are securely held and clamped together by the end pieces A A', and I am enabled thereby to form a practically homogeneous and compact magnet that is simply made and not liable to get out of order. The arms or projections for supporting the armature being formed integral with the end plates furnish a rigid support for the armature-bearings F, which may be secured to and held in position by nuts *f*, passing through holes in the arms or extensions, and by this means an accurate adjustment of the armature-shaft is provided, so that the armature will run evenly and smoothly and yet be in close relations to the field-magnet poles.

It is well-known that in the rapid rotation of the armature, especially when the wire of the armature is held in grooves in the metal plates constituting the armature-core, so that the iron comes to the periphery, as in the Pacinotti type of machines, there is a disagreeable humming or singing noise produced, which I have overcome by making the grooves, and consequently the windings of the armature, slightly spiral in relation to the longitudinal axis of the armature. This is clearly illustrated in Fig. 1, in which the armature G is preferably made up of a number of plates of sheet metal having projections which unite to form a series of longitudinal ribs $g$, with openings or notches $h$ between them, in which the windings of the armature are placed. I make these ribs spiral with relation to the axis of the armature, so that only a slight portion of any one of the openings is opposite the edge of the field-magnet at the same time, and thereby the rapid chopping or air-pounding which results in the humming or singing noise is avoided.

Another feature of this construction, which, perhaps, is the more important, arises from the fact that the exposed portions of the ribs of metal of the armature tend to become polarized and act to some extent as independent magnets, so that as each projection leaves the edge of the adjacent field-magnet there is a tendency to hang or hold on, and this is particularly apparent when the motor is started, as the armature will not commence to rotate until considerable current is applied to the motor. This objection I find is overcome by making the ribs and the corresponding intervening grooves spiral or arranging them in planes intersecting the armature-shaft at an angle, as shown in Fig. 1, and I preferably let one end of the spiral on the outer surface of the armature lead the opposite end about the width of the projection between the grooves, and I have found this a most desirable proportion for overcoming the objections stated.

With the construction thus set forth I am enabled to overcome the objections to the humming and singing noise produced by the motor when running at considerable speed, and to be able to start the motor with a smaller current and to avoid any hinderance or retardation which may be due to this tendency of the ribs of the armature to become independent magnets and attract or hang on to the field-pole, and by making the fields of sheet metal and securing them together by the end plates and bolts passing therethrough, which plates are provided with extensions for supporting the armature, an exceedingly compact, simple, and cheap motor is provided, which is capable of producing a comparatively great motive power.

While I have described my invention as applied to an electric motor, it is evident that the various features of novelty may be applied to an electric generator.

What I claim is—

1. An electric motor the field-magnets of which are composed of plates of sheet metal clamped between the end plates, recesses in said end plates, and rods having reduced ends passing through the sheet-metal plates and end plates and secured by bolts, whereby the whole is securely clamped together, substantially as described.

2. In an electric motor the field-magnets of which are made up of sheet-metal plates, a skeleton frame-work consisting of two end plates, each plate consisting of a base-piece, two uprights supporting the pole-pieces, and arms or extensions integral with said uprights for supporting the bearings of the armature, the two end plates being secured together by rods having shoulders fitting recesses in the end plates, whereby a substantially rigid structure is formed for supporting the field-magnet plates and the armature, substantially as described.

In testimony whereof I have signed my name to this specification in the presence of two subscribing witnesses.

WARREN S. HILL.

Witnesses:
LEONARD STONE,
JOHN M. HAWKS.